W. V. VAN ETTEN.
WHEELBARROW.
APPLICATION FILED OCT. 20, 1920.

1,377,946.

Patented May 10, 1921.

Inventor
William V. Van Etten.

By Fred G. Dieterich
Attorneys

UNITED STATES PATENT OFFICE.

WILLIAM V. VAN ETTEN, OF LANGLEY PRAIRIE, BRITISH COLUMBIA, CANADA.

WHEELBARROW.

1,377,946.  Specification of Letters Patent.  Patented May 10, 1921.

Application filed October 20, 1920. Serial No. 418,251.

*To all whom it may concern:*

Be it known that I, WILLIAM V. VAN ETTEN, citizen of the United States, residing at Langley Prairie, in the Province of British Columbia, Canada, have invented certain new and useful Improvements in Wheelbarrows, of which the following is a specification.

This invention relates to an improved means for supporting a wheelbarrow on its wheel whereby a spring connection is introduced between the bearings of the wheel and the load supporting frame of the barrow, and at the same time the position of the wheel may be adjusted in its distance from the handle of the barrow, or in other words in relation to a vertical line through the center of gravity of the load.

The means whereby these desired objects are attained is fully set forth in the following specification, reference being made to the drawings by which it is accompanied, in which.

Figure 1:
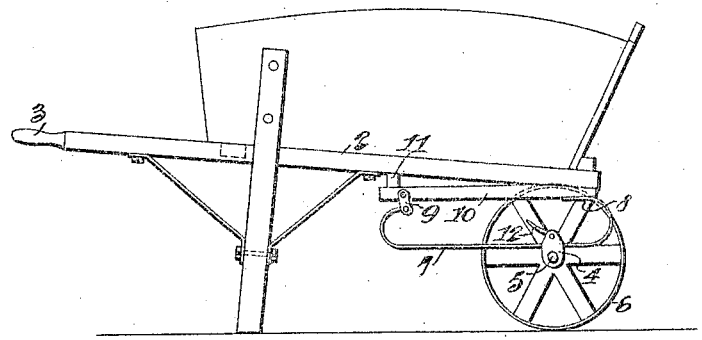
Figure 1 shows the barrow in side elevation.

In these drawings 2 represents the side members of the barrow under frame which at one end form the shafts or handles 3.

Instead of mounting the bearings 4 of the axle 5 of the wheel 6 directly on the ends of these side frames 2, as is usual, they are adjustably secured on springs 7, the forward ends of which springs are upwardly and backwardly turned as at 8 for attachment to the ends of the side frames 2 and the backward ends of 7 are connected by links 9 to the under frame of the barrow.

Figure 2:
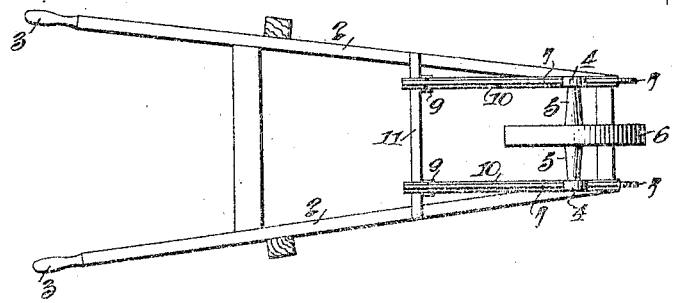
Fig. 2 is an inverted plan of the wheelbarrow showing the spring supports in relation to the under frame of the wheelbarrow and its wheel.
Figure 3:
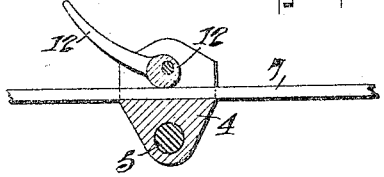
Fig. 3 is an enlarged detail in sectional elevation showing the manner of clamping the axle bearing on the spring, and Fig. 4, an end elevation of the same.
Figure 4:
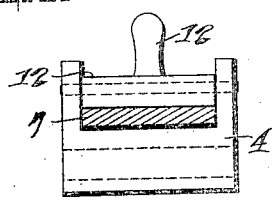

These springs 7 require to be parallel to one another for endwise adjustment of the axle bearings thereon, while the frame members 2 diverge from adjacent the wheel to the handle shafts as shown in Fig. 2.

The links 9 are pin-connected to parallel longitudinal members 10 secured at the front end to the members 2, and adjacent the ends of the springs 7, to a rail 11 secured across between the members 2.

The axle bearings 4 of the wheel are slidably mounted to be adjustable endwise on the springs 7, the edges of each bearing member passing around the edges of its spring to retain it thereon. The bearing members 4 are secured in any desired position of endwise adjustment on the springs by a cam lever 12 mounted between the upwardly projecting edges of each bearing member, which cam is free from engagement with the upper side of the spring 7 when the lever of the cam is in the upright position but is tightened thereto when that lever lies along the spring.

The position of the wheel 6 may thus be adjusted in endwise relation to the load on the barrow, so as to relieve the handle 3 of as much as possible of the weight.

With this construction substantial springs are interposed between the wheel and the frame of the barrow, which materially save the hands of the user from the jar and vibration while traveling over a rough road, and in the facility for adjustment of the wheel the user is enabled to endwise balance his load on the wheel and can therefore better direct his attention to the balancing of the load laterally on it.

Having now particularly described my invention, I hereby declare that what I claim as new and desire to be protected in by Letters Patent, is:

1. A means for supporting the frame of a wheelbarrow on the axle of its wheel, said means comprising the combination with the frame of the barrow and the axle of the wheel, of springs parallel to one another, one end of each spring secured to the under frame of the barrow and the other end of each flexibly supporting the under frame, and means for connecting the axle of the wheel to the springs to be endwise adjustable thereon.

2. A means for supporting the frame of a wheelbarrow on the axle of its wheel, said means comprising the combination with the frame of the barrow and the axle of the wheel, of springs parallel to one another one end of each spring secured to the under frame of the barrow adjacent the front end and the other end link-connected to the under frame toward the other end, and means for connecting the axle of the wheel to the springs to be endwise adjustable thereon.

3. A means for supporting the frame of a wheelbarrow on the axle of its wheel, said means comprising a bearing for each end of the axle, a spring on which each bearing is endwise movable, one end of each spring secured to the under frame of the barrow adjacent the front end and the other end link-connected to the frame toward the other end that the springs are parallel to one another, and means for securing the bearings of the wheel at any desired position of endwise adjustment on the springs.

4. A means for supporting the frame of a wheelbarrow on the axle of its wheel, said means comprising the combination with the frame of the barrow and the axle of the wheel, of two springs parallel to one another one end of each bent upward and backward and attached to the barrow under frame and the under end of each bent upward and forward and link-connected to the under frame, a bearing for each end of the axle, said bearings endwise movable on the springs, and means for securing each bearing in any desired position of endwise adjustment.

In testimony whereof I affix my signature.

WILLIAM V. VAN ETTEN.